(12) United States Patent
Nishiyama

(10) Patent No.: US 7,700,685 B2
(45) Date of Patent: Apr. 20, 2010

(54) METHOD OF PRODUCING HYDROUS ETHYLENE-VINYL ALCOHOL COPOLYMER COMPOSITION

(75) Inventor: Kazuhiro Nishiyama, Osaka (JP)

(73) Assignee: The Nippon Synthetic Chemical Industry Co., Ltd., Osaka-shi (JP)

(*) Notice: Subject to any disclaimer, the term of this patent is extended or adjusted under 35 U.S.C. 154(b) by 0 days.

(21) Appl. No.: 12/302,394

(22) PCT Filed: May 28, 2007

(86) PCT No.: PCT/JP2007/060805

§ 371 (c)(1),
(2), (4) Date: Nov. 25, 2008

(87) PCT Pub. No.: WO2007/139054

PCT Pub. Date: Dec. 6, 2007

(65) Prior Publication Data

US 2009/0186978 A1 Jul. 23, 2009

(30) Foreign Application Priority Data

May 30, 2006 (JP) .............................. 2006-150668

(51) Int. Cl.
 *C08F 6/06* (2006.01)
 *C08L 29/04* (2006.01)
(52) U.S. Cl. ........................ 524/557; 523/315; 528/499; 524/379
(58) Field of Classification Search ................. 523/315; 524/379, 557; 528/499
See application file for complete search history.

(56) References Cited

U.S. PATENT DOCUMENTS 6,716,930 B2 * 4/2004 Yanagida et al. ......... 525/330.6

FOREIGN PATENT DOCUMENTS

EP 1162215 12/2001

(Continued)

OTHER PUBLICATIONS

International Search Report for International Application No. PCT/JP2007/060805 dated Jun. 7, 2007.

(Continued)

*Primary Examiner*—Fred M Teskin
(74) *Attorney, Agent, or Firm*—Kratz, Quintos & Hanson, LLP

(57) ABSTRACT

An ethylene-vinyl alcohol copolymer (EVOH) solution is introduced into a tower vessel (1) from a first inlet (2) provided at an upper portion of the tower vessel (1). Water vapor is introduced into the tower vessel (1) from a second inlet (3) provided at a lower portion of the vessel (1). The EVOH solution moves downward in the vessel (1), while the water vapor moves upward. The EVOH solution is kept in counterflow contact with the water vapor. Water is supplied from a water supplying portion (5) located between the first inlet (2) and a tower top (4), whereby a water layer is formed above the first inlet (2). A water/methanol vapor mixture is extracted from the tower top (4) and condensed in a condenser (6) to be thereby recovered in the form of a methanol aqueous solution. Droplets of the EVOH solution contained in the water/methanol vapor mixture are trapped in the water layer formed above the first inlet (2) and, therefore, are less liable to be introduced into the condenser (6). This suppresses extraction of the droplets of the EVOH solution together with the vapor to the outside of the tower vessel (1) during replacement of the EVOH solution with water in the tower vessel (1).

3 Claims, 1 Drawing Sheet

FOREIGN PATENT DOCUMENTS

| | | |
|---|---|---|
| EP | 1179546 | 2/2002 |
| EP | 1225185 | 7/2002 |
| EP | 1547744 | 6/2005 |
| JP | 56-22305 | 3/1981 |
| JP | 10-338708 | 12/1998 |
| JP | 2001-131116 A1 | 5/2001 |
| JP | 2002-121216 A1 | 4/2002 |
| JP | 2002-121290 A1 | 4/2002 |

OTHER PUBLICATIONS

Extended European Search Report dated Jan. 28, 2010.

* cited by examiner

Figure
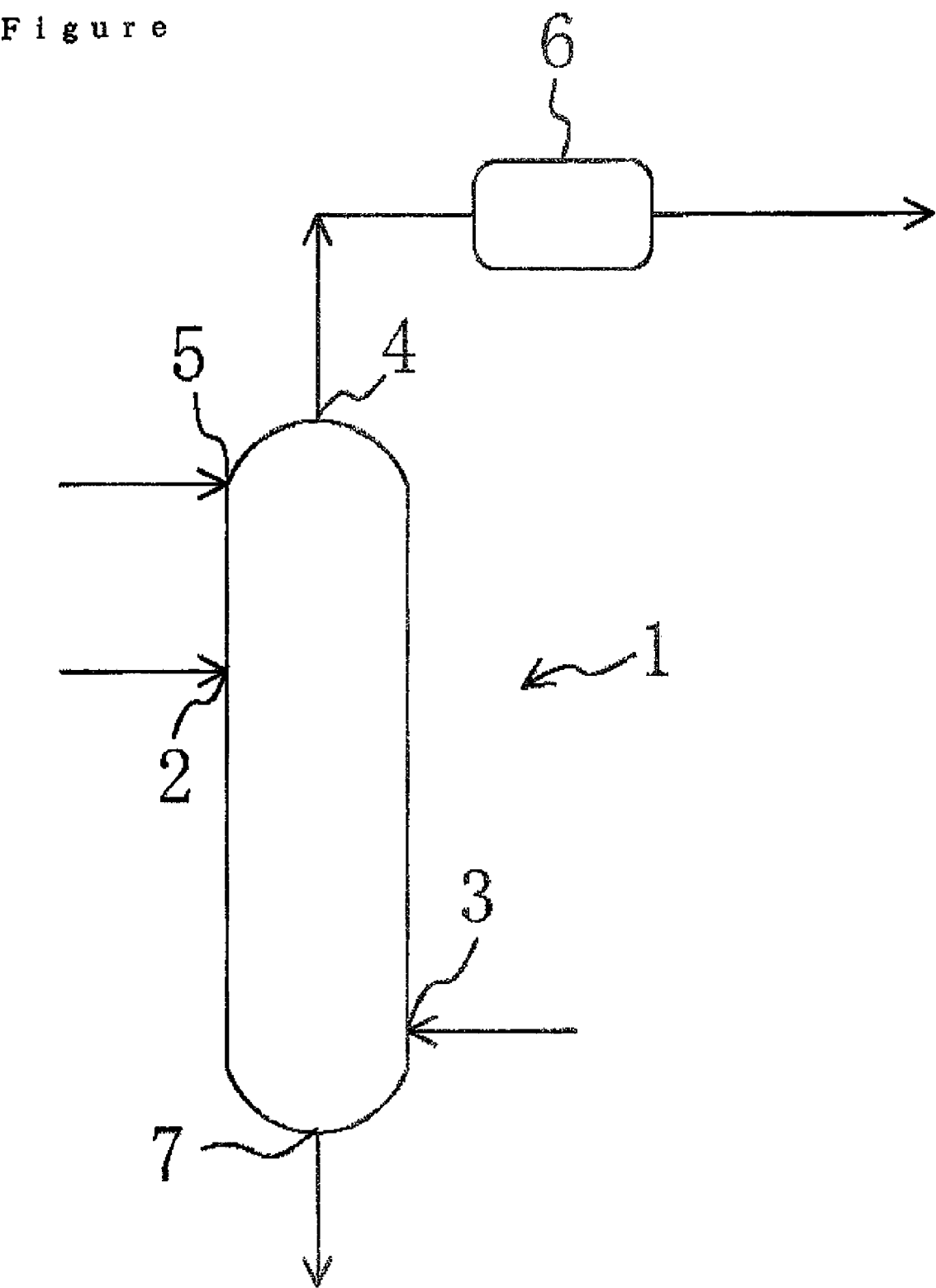

METHOD OF PRODUCING HYDROUS ETHYLENE-VINYL ALCOHOL COPOLYMER COMPOSITION

TECHNICAL FIELD

The present invention relates to a method of producing a hydrous ethylene-vinyl alcohol copolymer (hereinafter referred to as EVOH) composition by keeping an EVOH solution in counter-flow contact with water vapor in a tower vessel to replace at least part of a solvent in the solution with water.

BACKGROUND ART

An EVOH having an excellent oxygen gas barrier property is widely used as a material for a variety of packages and bottles. The EVOH is produced by copolymerizing vinyl acetate and ethylene and saponifying the resulting ethylene-vinyl acetate copolymer in the presence of an alkaline catalyst with the use of methanol as a solvent. The EVOH resulting from the saponification is provided in the form of a methanol solution under heating and pressure. A part of methanol in the EVOH methanol solution is replaced with water. The resulting EVOH water/methanol solution can be stably handled under ordinary temperature and ordinary pressure conditions.

The replacement of the EVOH solution with water is industrially continuously carried out in a tower vessel. Patent Documents 1 and 2, for example, disclose methods in which an EVOH methanol solution supplied from an upper portion of a plate tower or a packed tower is kept in counter-flow contact with water vapor supplied from a lower portion of the tower for the replacement of a part of methanol in the solution with water. In the methods disclosed in Patent Documents 1 and 2, an excess portion of the water vapor and methanol vapor resulting from the replacement with water are extracted from a tower top of the tower vessel to be introduced into a condenser, and liquefied in the condenser.

Patent Document 1: JP-A-2002-121216

Patent Document 2: JP-A-2002-121290

DISCLOSURE OF THE INVENTION

Problems to be Solved by the Invention

However, the inventor of the present invention found that droplets of the EVOH solution extracted together with the water vapor are condensed in the condenser, resulting in deposition of the EVOH. The deposition of the EVOH on an interior wall of the condenser reduces the condensation efficiency, and clogs a conduit of the condenser to prevent the continuous replacement of the EVOH solution with water. Further, a loss of a part of the EVOH to the outside the tower vessel reduces the yield.

It is an object of the present invention to suppress the extraction of the droplets of the EVOH solution together with the vapor to the outside of the tower vessel during the replacement of the EVOH solution with water in the tower vessel.

Means for Solving the Problems

The inventor of the present invention found that the droplets of the EVOH solution contained in the water/alcohol vapor mixture could be trapped in a water layer formed by supplying water to a position above an EVOH solution introducing position during the replacement or the EVOH solution with water in the tower vessel, and further conducted intensive studies. As a result, the inventor attained the present invention.

The present invention provides a method of producing a hydrous ethylene-vinyl alcohol copolymer composition, the method including the steps of: introducing a solution containing an EVOH and an alcohol into a tower vessel from a position at an upper portion of the tower vessel; introducing water vapor into the tower vessel from a lower portion of the tower vessel; keeping the solution in counter-flow contact with the water vapor in the tower vessel; extracting at least part of the alcohol from the tower vessel at a position above the solution introducing position; and extracting a hydrous composition containing the EVOH from the tower vessel; wherein water is supplied to a position above the solution introducing position. The water supplying position is preferably located below the alcohol extracting position.

The present invention further provides a method of producing a hydrous ethylene-vinyl alcohol copolymer composition, the method including the steps of: introducing a solution containing an EVOH and an alcohol into a tower vessel from a position at an upper portion of the tower vessel; introducing water vapor into the tower vessel from a lower portion of the tower vessel; keeping the solution in counter-flow contact with the water vapor in the tower vessel; extracting at least part of the alcohol from the tower vessel at a position above the solution introducing position; and extracting a hydrous composition containing the EVOH from the tower vessel; wherein a water layer is formed at a position above the solution introducing position.

Effects of the Invention

The present invention suppresses the extraction of the droplets of the EVOH solution together with the vapor to the outside of the tower vessel. This suppresses the reduction in condensation efficiency and the clogging of the conduit which nay otherwise occur due to the deposition of the EVOH on the interior wall of the condenser. Therefore, the replacement of the EVOH solution with water can be continuously carried out. Further, the reduction in yield is minimized.

BRIEF DESCRIPTION OF THE DRAWINGS

The sole FIGURE is a schematic diagram of an EVOH solution-water replacement apparatus.

DESCRIPTION OF REFERENCE CHARACTERS

1: Tower vessel
2: First inlet
3: Second inlet
4: Tower top
5: Water supplying portion
6: Condenser
7: Tower bottom

BEST MODE FOR CARRYING OUT THE INVENTION

An embodiment of the present invention will hereinafter be described with reference to the attached drawing. The FIGURE is a schematic diagram of an apparatus for replacing a solvent in an EVOH solution with water. The EVOH solution is introduced as a material into a tower vessel 1 from a first inlet 2 provided at an upper portion of the tower vessel 1.

Water vapor is introduced into the tower vessel 1 from a second inlet 3 provided at a lower portion of the tower vessel 1. The EVOH solution moves downward in the vessel 1, while the water vapor moves upward. Thus, the EVOH solution is kept in counter-flow contact with the water vapor. Water is supplied from a water supplying portion 5 located between the first inlet 2 and a tower top 4, whereby a water layer is formed above the first inlet 2. A water/methanol vapor mixture is extracted from the tower top 4 and condensed in a condenser 6 to be thereby recovered in the form of a methanol aqueous solution. Droplets of the EVOH solution contained in the water/methanol vapor mixture are trapped in the water layer formed above the first inlet 2 and, therefore, are less liable to be introduced into the condenser 6. A hydrous EVOH composition according to the present invention is extracted from a tower bottom 7, and pelletized in the subsequent step.

In the present invention, the EVOH solution is typically prepared by saponifying an ethylene-vinyl ester copolymer obtained by copolymerization of a fatty acid vinyl ester such as vinyl acetate with ethylene. Solution polymerization, suspension polymerization, emulsion polymerization or bulk polymerization may be employed for the polymerization of the fatty acid vinyl ester and ethylene. Further, the polymerization may be achieved through a continuous process or a batch process.

Examples of the fatty acid vinyl ester include vinyl formate, vinyl acetate, vinyl propionate, vinyl valerate, vinyl caprate, vinyl laurate and vinyl stearate. From the viewpoint of industrial advantages, a saponification product of an ethylene-vinyl acetate copolymer is preferred.

The EVOH preferably has an ethylene content of 3 to 70 mol %. If the ethylene content is less than 3 mol %, the melt-moldability is impaired. The ethylene content is more preferably not less than 20 mol %, further more preferably not less than 25 mol %. On the other hand, if the ethylene content is greater than 70 mol %, the gas barrier property is impaired. The ethylene content is more preferably not greater than 60 mol %, further more preferably not greater than 50 mol %. Further, a saponification degree of not less than 90 mol % is preferred because an excellent gas barrier property can be ensured. The saponification degree is more preferably not less than 98 mol %, further more preferably not less than 99 mol %.

The EVOH may be a copolymer obtained by copolymerization with another monomer, as long as the effects of the present invention are not impaired. Examples of such a monomer include: unsaturated carboxylic acids such as (meth) acrylic acid, crotonic acid, itaconic acid and maleic anhydride, monoalkyl or dialkyl esters of any of these unsaturated carboxylic acids, nitriles of any of the unsaturated carboxylic acids such as (meth)acrylonitrile, and amides of any of the unsaturated carboxylic acids such as (meth)acrylamide; olefin-sulfonic acids such as ethylenesulfonic acid and (meth) allylsulfonic acid and salts of any of these olefin-sulfonic acids; alkyl vinyl ethers, polyoxyalkyl allyl ethers and allyl esters; and vinyl ketones, N-methylpyrrolidone, vinylidene chloride, vinylidene fluoride, unsaturated vinyl monomers containing an oxyalkylene group, vinylethylene carbonate, 3,4-diacetoxy-1-butene, glycerin monoallyl ether, vinylalkoxysilane and the like.

After the fatty acid vinyl ester and the ethylene are polymerized in a predetermined polymerization ratio, a polymerization inhibitor is added as required, and an unreacted portion of the ethylene gas is evaporated away. Then, an unreacted portion of the fatty acid vinyl ester is removed from the ethylene-vinyl ester copolymer solution from which the ethylene is evaporated away. For example, the copolymer solution is continuously supplied at a constant rate into a column filled with Raschig rings from an upper portion of the column, and vapor of an organic solvent (e.g., an alcohol such as methanol) is blown into the column from a lower portion of the column. Thus, a vapor mixture of the organic solvent and unreacted vinyl ester is distilled from a column top, and the copolymer solution free from the unreacted fatty acid vinyl ester is extracted from a column bottom.

An alkali catalyst is added to the copolymer solution free from the unreacted fatty acid vinyl ester to saponify a fatty acid vinyl ester component of the copolymer. The saponification may be achieved through a continuous process or a batch process. Usable examples of the alkali catalyst include sodium hydroxide, potassium hydroxide and alkali metal alcoholates.

The EVOH solution subjected to the saponification typically has an EVOH concentration of 15 to 50 mass %. If the EVOH concentration is less than 15 mass %, the productivity is reduced, resulting in disadvantageous costs. The EVOH concentration is more preferably not less than 20 mass %, further more preferably not less than 25 mass %. If the EVOH concentration is greater than 50 mass %, gelling is liable to occur. The EVOH concentration is more preferably not greater than 40 mass %, further more preferably not greater than 35 mass %. The EVOH solution may contain water or other solvent, as long as the effects of the present invention are not impaired.

For efficient replacement with water, an alcohol having a boiling point of less than 100° C. is preferably used as the alcohol. Specific examples of the alcohol include methyl alcohol, ethyl alcohol, n-propyl alcohol, isopropyl alcohol and t-butyl alcohol, among which methyl alcohol is particularly preferred.

The EVOH solution subjected to the saponification is introduced into the tower vessel 1, and kept in contact with water vapor in the vessel 1. Thus, the alcohol in the EVOH solution is extracted together with the water vapor from the tower top 4 of the vessel 1, and a hydrous EVOH composition with at least part of the alcohol thereof replaced with water is extracted from the tower bottom 7 of the vessel 1. The hydrous EVOH composition extracted from the vessel 1 may be completely free from the alcohol. In other words, all the alcohol in the EVOH solution may be replaced with water. Reduction in alcohol content prevents vaporization of the alcohol in the subsequent step such as a precipitation step, thereby maintaining a proper working environment or peripheral environment. Even if the temperature of rinsing water to be used for rinsing away the residue of the saponification catalyst is increased, the resulting pellets are less liable to adhere to each other. Therefore, a rinsing speed can be increased by increasing the temperature of the rinsing water.

A plate tower or a packed tower may be used as the tower vessel 1, but it is preferred to use the plate tower. Where the EVOH solution has a higher concentration or a higher viscosity, the process slowly proceeds in the packed tower, so that clogging of a filler is liable to occur. Examples of the plate tower include a porous plate tower and a bubble-cap plate tower. A material for the tower vessel 1 is not particularly limited, but is preferably a stainless steel for corrosion resistance.

The EVOH solution is introduced into the tower vessel 1 from the first inlet 2 provided at the upper portion of the tower vessel 1, and water vapor is introduced into the tower vessel 1 from the second inlet 3 provided at the lower portion of the tower vessel 1. Thus, the EVOH solution is kept in counter-flow contact with the water vapor, whereby the alcohol in the EVOH solution is extracted together with the water vapor from the tower top 4. The alcohol vapor and the water vapor thus extracted are condensed in the condenser 6, taken out in the form of an alcohol aqueous solution, and refined as required for reuse. The upper portion of the tower vessel 1 is herein defined as a portion of the tower vessel extending from the tower top 4 to about one third the height of the tower vessel 1, and the lower portion of the tower vessel is herein defined as a portion of the tower vessel extending from the tower bottom 7 to about one third the height of the tower vessel 1.

If an excessively small amount of the water vapor is introduced, an alcohol removing efficiency is reduced. An excessively great amount of the water vapor results in disadvantageous costs. Therefore, the amount of the water vapor to be introduced is preferably 0.01 to 30, more preferably 0.05 to 10, further more preferably 0.07 to 5, as expressed by a mass ratio with respect to the amount of the EVOH solution to be introduced. The water vapor to be kept in contact with the EVOH solution may contain the alcohol in a proportion of not greater than 10 parts by mass based on 100 parts by mass of the water vapor, but preferably contains no alcohol for efficient removal of the alcohol.

The internal temperature of the tower vessel 1 is selected so as to allow the EVOH solution to have proper fluidity and to prevent the gelation of the EVOH solution. More specifically, the internal temperature of the tower vessel 1 is not lower than 40° C., preferably not lower than 60° C., more preferably not lower than 70° C., further more preferably not lower than 80° C. On the other hand, if the internal temperature of the vessel 1 is too high, the EVOH resin is likely to be degraded. Therefore, the internal temperature of the vessel 1 is preferably not higher than 160° C., more preferably not higher than 140° C. If the internal pressure of the tower vessel 1 is too low, the alcohol removing efficiency is reduced. On the other hand, if the internal pressure of the tower vessel 1 is too high, the EVOH is susceptible to thermal degradation. Therefore, the internal pressure of the vessel 1 is preferably 0.05 to 1 MPaG, more preferably 0.08 to 0.9 MPaG, further more preferably 0.1 to 0.8 MPaG.

The water supplying portion 5 is disposed between the first inlet 2 and the tower top 4 or the tower vessel 1, and water is supplied from the water supplying portion 5. Where the plate tower is used as the tower vessel 1, the water supplying portion 5 is located at a position such that the water can be supplied to a plate located at a higher level than a plate to which the EVOH solution is supplied. The water is preferably supplied to the uppermost plate. By thus supplying the water to the upper plate, the water layer is formed on the plate.

The water layer is not limited to a single water layer formed on a single plate, but may include a plurality of water layers respectively formed on two or more plates.

The amount of the water to be supplied from the water supplying portion 5 is 10/1 to 300/1 (EVOH solution/water) typically about 3/1, as expressed by a mass ratio with respect to the amount of the EVOH solution to be introduced. The water may be supplied continuously or intermittently, but is desirably supplied so that the water layer is constantly formed. Like the water vapor to be introduced into the tower vessel 1 from the second inlet 3, the water to be supplied from the water supplying portion 5 may contain the alcohol in a proportion of not greater than 10 parts by mass based on 100 parts by mass of the water. However, the water preferably contains no alcohol for prevention of increase in the alcohol content of the hydrous EVOH composition.

The water layer formed by supplying the water from the water supplying portion 5 traps the droplets of the EVOH solution contained in the water/alcohol vapor mixture. More specifically, where the tower vessel 1 is the plate tower, the water is supplied to a single plate or two or more plates located between the water supplying potion 5 and the first inlet 2, so that the water layer is formed on the plate located above the first inlet 2. The water/alcohol vapor mixture passes through the water layer, whereby the droplets of the EVOH solution in the vapor mixture are trapped by the water layer. A portion of the EVOH solution splashed directly from the first inlet 2 is also trapped by the water layer. Thus, the droplets of the EVOH solution are less liable to be introduced into the condenser 6. This suppresses the reduction in condensation efficiency and the clogging of the conduit, which may otherwise occur due to the deposition of the EVOH on the interior wall of the condenser 6. Therefore, the replacement of the EVOH solution with the water can be continuously carried out. Further, the reduction in yield due to the loss of the EVOH solution is also suppressed.

While the preferred embodiment of the present invention has thus been described, it should be understood that the technical purview of the present invention be not limited to the above description of the embodiment. It will be understood by those skilled in the art that the embodiment is merely illustrative and various alterations and modifications may be made without departing from the scope of the invention. In the embodiment described above, the water supplying portion 5 is provided between the first inlet 2 and the tower top 4 of the tower vessel 1, but may be provided, for example, adjacent to the tower top 4. Further, the second inlet 3 for introduction of the water vapor may be provided adjacent to the tower bottom 7.

EXAMPLES

The embodiment of the present invention will be described more specifically by way of the following inventive example and comparative example. It should be noted that the invention be not limited to the following example, which may be modified within the scope of the invention.

Example

A methanol solution containing 30 mass % of an EVOH having an ethylene content of 44 mol % and a saponification degree of 99.7 mol % was supplied to the second highest plate from a tower top of a 10-plate tower at a rate of 1000 parts by mass/hr, and water vapor was supplied from the lowermost plate at a rate of 100 parts by mass/hr. Further, water was supplied to the uppermost plate. The internal temperature and the internal pressure of the tower were 90° C. (at the tower top) and 0.1 MPaG (at the tower top), respectively. Methanol vapor and water vapor distilled away from the tower top were condensed in a condenser, and recovered in the form of a methanol aqueous solution. A hydrous EVOH composition (containing 40 mass % of EVOH and having a methanol/water ratio of 80/20) was extracted from a tower bottom. After completion of the process, deposition of the EVOH was not visually observed on the interior wall of the condenser.

Comparative Example

The replacement of the EVOH solution with water was carried out in substantially the same manner as in Example, except that no water was supplied to the uppermost plate. After completion of the process, deposition of a small amount of the EVOH was visually observed on the interior wall of the condenser.

What is claimed is:

1. A method of producing a hydrous ethylene-vinyl alcohol copolymer composition, the method comprising the steps of:
   introducing a solution containing an ethylene-vinyl alcohol copolymer and an alcohol into a tower vessel from a solution introducing position located at an upper portion of the tower vessel;
   introducing water vapor into the tower vessel from a water vapor introducing position located at a lower portion of the tower vessel;
   keeping the solution in counter-flow contact with the water vapor in the tower vessel;
   extracting at least part of the alcohol from the tower vessel at an alcohol extracting position located above the solution introducing position; and
   extracting a hydrous composition containing the ethylene-vinyl alcohol copolymer from the tower vessel at a position located below the water vapor introducing position;
   wherein water is supplied to a water supplying position located above the solution introducing position.

2. A method as set forth in claim 1, wherein the water supplying position is located below the alcohol extracting position.

3. A method of producing a hydrous ethylene-vinyl alcohol copolymer composition, the method comprising the steps of:
   introducing a solution containing an ethylene-vinyl alcohol copolymer and an alcohol into a tower vessel from a solution introducing position located at an upper portion of the tower vessel;
   introducing water vapor into the tower vessel from a lower portion of the tower vessel;
   keeping the solution in counter-flow contact with the water vapor in the tower vessel;
   extracting at least part of the alcohol from the tower vessel at a position above the solution introducing position; and
   extracting a hydrous composition containing the ethylene-vinyl alcohol copolymer from the tower vessel;
   wherein a water layer is formed at a position above the solution introducing position.

* * * * *